INVENTORS
MELVIN F. HEILWEIL
GERALD A. MALEY
BY John F. Ostendorf
ATTORNEY

| INPUTS | | | TRANSISTORS IN BLOCKS | | | OUTPUTS | | |
|---|---|---|---|---|---|---|---|---|
| a | b | c | 1 | 2 | 3 | A | B | C |
| 1 | 1 | 1 | — | — | — | 1,1,0 | 1,0,1 | 0,1,1 |
| 0 | 1 | 1 | ON | OFF | ON | 1 | 1 | 0 |
| 1 | 0 | 1 | ON | ON | OFF | 1 | 0 | 1 |
| 1 | 1 | 0 | OFF | ON | ON | 0 | 1 | 1 |

United States Patent Office
3,178,590
Patented Apr. 13, 1965

3,178,590

MULTISTATE MEMORY CIRCUIT EMPLOYING AT LEAST THREE LOGIC ELEMENTS

Melvin F. Heilweil, Wappingers Falls, and Gerald A. Maley, Poughkeepsie, N.Y., assignors to International Business Machines Corporation, New York, N.Y., a corporation of New York Filed Apr. 2, 1962, Ser. No. 184,101
10 Claims. (Cl. 307—88.5)

This invention relates to digital computer memory circuits, and more particularly, to a latch circuit having a multiple number of stable states.

In the development of present day digital computers, efforts are being concentrated on obtaining greater machine versatility at less expense. Since computer versatility is determined to a large extent by the functional capabilities of a machine's circuits (including the operating speeds of these circuits), developmental endeavors are being directed at enhancing these capabilities. As is well known in the art, the operating speeds of such circuits are greatly dependent on the number of stages of logic required to perform a particular operation. This factor is particularly true in the case of circuits which perform the more complex operations, such as the storage of a multiple number of states of information.

Memory circuits, such as latches, for individually storing a multiple number of states of information require only two stages of logic (for example, the OR-INVERT or the AND-INVERT circuit combinations) for performing the storage portion of the memory function for each state of information. However, conventional multiple state memory circuits are required to abandon this basic two stage configuration in order to perform the control portion of the memory function. Specifically, in some of these circuits a second combinatorial logic circuit must be connected between the stages of the basic two stage circuit, i.e., the AND-INVERT circuit requires the OR circuit connected in an AND-OR-INVERT configuration and the OR-INVERT circuit requires an AND circuit connected in an OR-AND-INVERT configuration. Consequently, conventional memory circuits are restricted to use where a circuit family is available having both the AND and the OR blocks. Not only is it necessary to have a circuit family available with both of these blocks, but also, the components in them are required to be more complex with additional levels of powering.

Accordingly, it is a primary object of the invention to provide basic logic circuitry operable as a memory to store a multiple number of states of information.

It is another object of the invention to provide a memory circuit, such as a latch, which accomplishes the storage and control of a multiple number of states of information by requiring only two stages of logic for each state of information that is to be stored.

It is a further object of the invention to provide a memory circuit responsive to $n$ bilevel input signals to store one of an equivalent number of states of information and to provide an output signal indicative of the state stored.

A further object of the invention is to provide a latch capable of being employed in a ternary system of logic or in a double-rail binary asynchronous system of logic.

In accordance with an aspect of the invention, there is provided a multiple state memory circuit employing an $n$ number of logic blocks equivalent in number to the number of states of information to be stored. Each logic block receives as its input all of the circuit input signals except one and feedback signals from the outputs of all of the blocks except its own. Each block combines its respective input signals and provides an output signal indicative of the state of that block. In order for a state of information to be stored, only one of the circuit input signals can be in an information state at a particular time and the state of the circuit is determined by the logic block which does not receive the circuit input signal in an information state as one of its input signals.

The invention has the advantageous feature of requiring only a two stage logic block for each state of information to be stored in performing a multiple state memory function by controlling the input signals supplied to the blocks.

Another feature of the invention enables it to be employed as the basic circuit block in all sequential logic circuits, such as adders, counters and registers.

A further feature of the invention enables the memory circuit to be employed in conjunction with conventional two state sequential logic circuits.

The foregoing and other objects, features and advantages of the invention will be apparent from the following more particular description of the preferred embodiments of the invention, as illustrated in the accompanying drawings, wherein.

Figure 1:
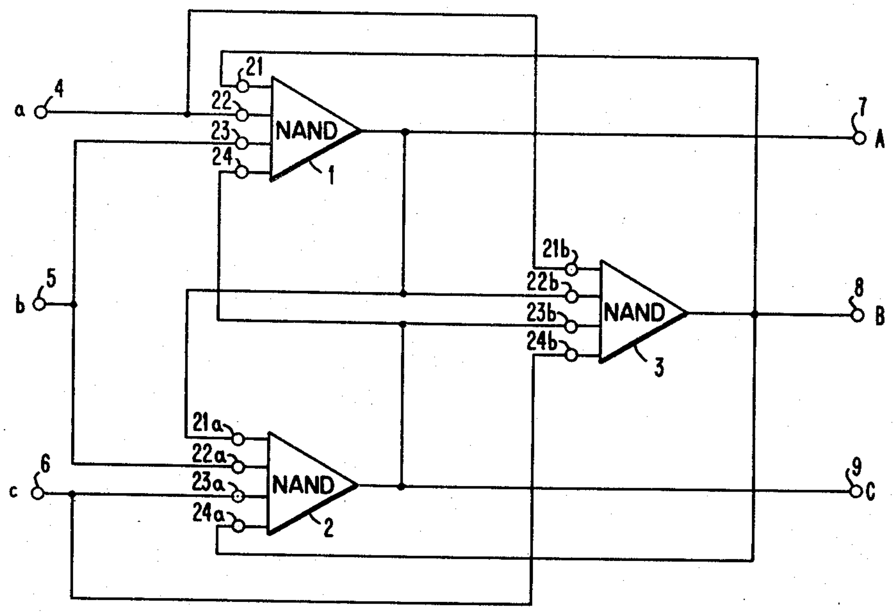
FIGURE 1 is a block diagram of a three state latch embodying the principles of the invention.
Figures 2, 2A:
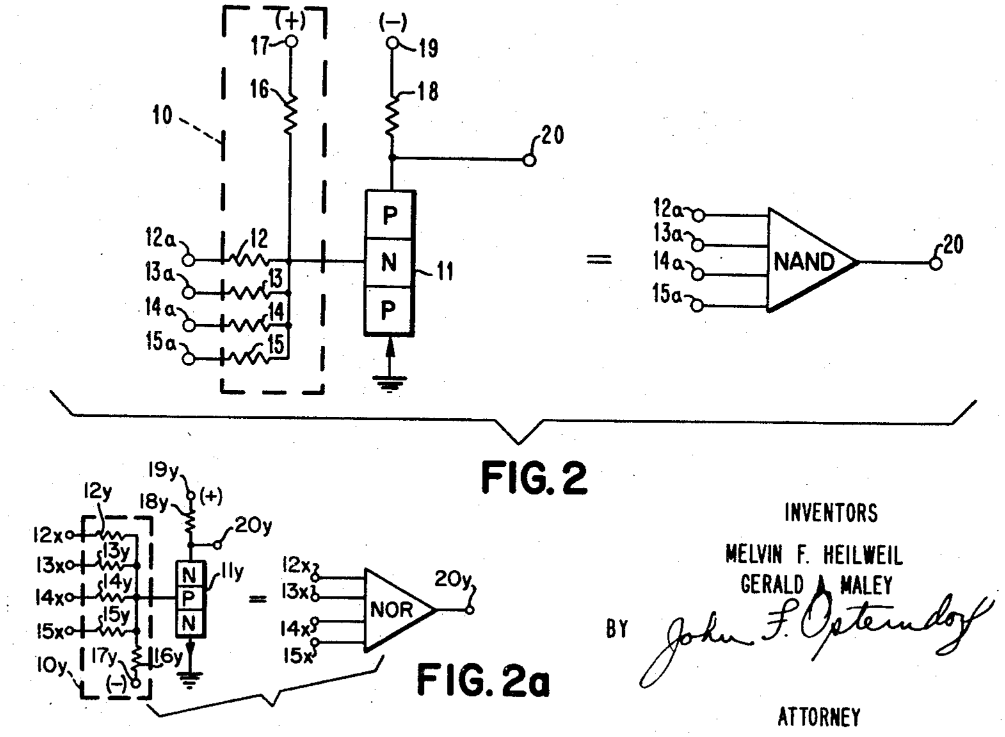
FIGURE 2 is a circuit diagram of a two stage NAND logic block suitable for use in the blocks of FIGURE 1.

FIGURE 2*a* is a circuit diagram of a two-stage NOR logical block suitable for use in the arrangement of FIGURE 1.

Figures 3, 4:
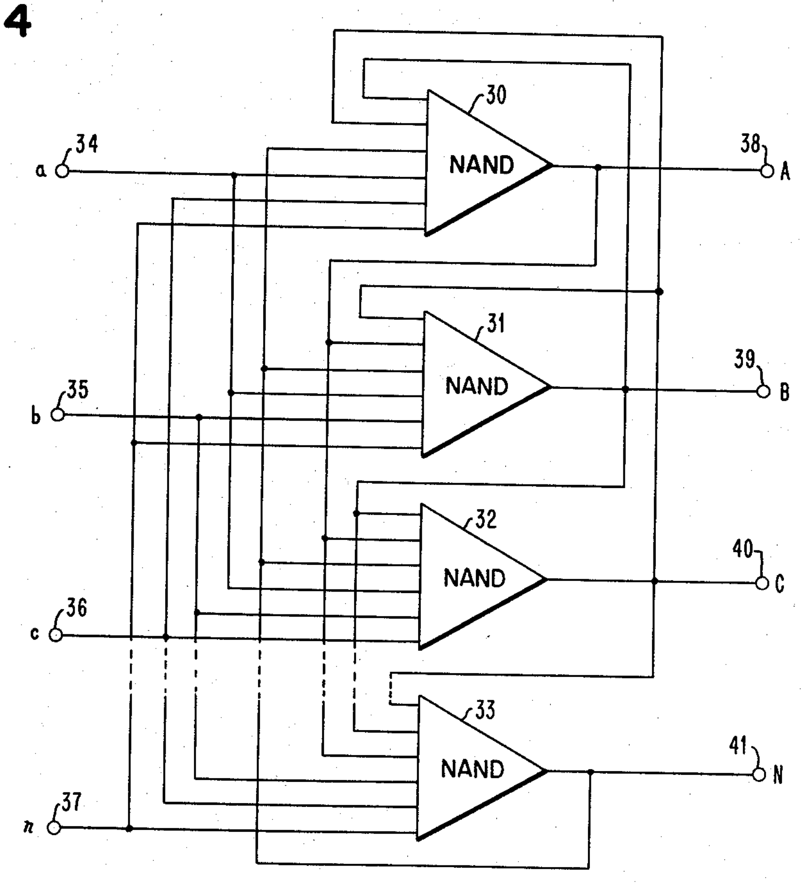

FIGURE 3 is a table relating the bilevel input signals to the conductivity states of the signal translating devices of the three state latch and to the output signals provided by the latch; and FIGURE 4 is a block diagram of a multiple state memory circuit for storing $n$ states of information according to the principles of the invention.

Referring now to FIGURE 1, the three state latch embodying the principles of the invention comprises three logic blocks 1, 2 and 3. Each block performs a two stage logic operation, for example, the AND-INVERT or NAND operation. Input signals $a$, $b$, $c$ are capable of residing at an "up" or "down" level and are coupled to circuit input terminals 4, 5, 6, respectively. Each logic block 1, 2, 3 also provides an output signal at respective ones of the output terminals 7, 8 and 9. These output signals are also bilevel in nature and are indicated at A, B, C.

As shown in FIGURE 2 each NAND block comprises an AND circuit indicated in the dashed lines by the reference character 10 and a single signal translating device, such as, the PNP transistor 11 connected in common emitter configuration to ground reference potential. The AND circuit has a four-way resistor input comprising the resistors 12–15 coupled respectively to the terminals 12*a*–15*a*, and a biasing resistor 16 connected to the positive voltage supply at the terminal 17. The output of the AND circuit is applied to the base electrode of transistor 11, and the collector of the transistor is biased through a resistor 18 by a negative voltage supply connected to the terminal 19.

It should be noted that the circuitry of the NAND block is provided merely by way of illustration, it being understood that other circuit arrangements may be employed to accomplish the NAND function. Similarly, these blocks may also be replaced with logic blocks performing the OR-INVERT or NOR function (refer to FIGURE 2*a*) without departing from the principles of the invention. In the NOR block of FIGURE 2*a*, the same reference characters are employed as in the NAND block of FIGURE 2 except that the suffixes are changed to $x$ and $y$.

As is well known in the art, an AND circuit provides an "up" level output signal when all of its input signals are at an "up" level. In all other instances, the circuit provides a "down" level in response to the level of the lowest input signal. Therefore, if the conventional binary code is employed wherein an "up" level indicates a "1" and a "down" level a "0," the AND circuit 10 provides a "0" input signal to the transistor 11 when any one or more of its input signals is at a "0." Consequently, the transistor 11 is rendered conductive only when a "0" input signal is supplied to it to provide a "1" output signal at terminal 20. When the input signal to the transistor 11 is a "1" the transistor is maintained in a nonconductive state and a "0" output signal is provided at terminal 20.

Referring again to FIGURE 1, each NAND block 1, 2, 3 has a four-way input, that is it receives as its input signals two of the three circuit input signals and feedback signals from the other two NAND blocks. For example, considering the block 1, the input signals are supplied at the terminals 21–24. The signals supplied at the terminals 22 and 23 are, respectively, the *a* and *b* circuit input signals and the signals supplied at the terminals 21 and 24 are feedback signals from the outputs of the blocks 3 and 2, respectively. Similarly, each of the NAND blocks 2 and 3 receives two of the circuit input signals and feedback signals from the outputs of the other two blocks at the terminals **21*a*–24*a* and 21*b*–24*b*, respectively. From the description which follows hereinafter, it will be apparent that the control of the storage of three states of information in the latch depends on the manner of application of these signals to the blocks 1, 2, 3**. In this way, the circuit is able to perform the memory function by using two stage logic blocks as opposed to the three stage logic blocks of prior art circuits.

With reference to the table of FIGURE 3, it should be noted that the binary "1" connotation is indicative of the absence of information whereas the binary "0" connotation manifests a state of information. This connotation applies for all NAND blocks; however, if NOR blocks are employed, then the connotation would be the opposite.

In operation, all of the input signals, *a*, *b*, *c* are normally in a "1" condition, i.e., at the "up" level of the bilevel input signal. When all of the input signals are in this noninformation bearing state, the circuit is latched in one of three possible states indicative of a stable condition. These states are indicated in Table 3 by the combined states of the three output signals A, B, C. These states are as follows: 110, 101, 011. When any one input signal is brought to a "down" level or "0" condition, then the circuit is set to one of the three states.

By way of illustration, if the *a* input is "0" and the *b* and *c* inputs are "1," the state of the circuit is indicated by the B output, that is, a "1" is provided at the output terminals 7 and 9 and a "0" is provided at the output terminal 8. To consider this illustration in greater detail, it has already been noted that the transistor of a NAND block provides a "1" output, when the associated AND circuit provides a "0" input to it. Thus, if the input at 22 is "0" and the input at 23 is "1," the NAND block 1 provides a "1" output which is coupled to 7, **21*a* and 22*b***. Since the *a* input is also coupled to **21*b*, NAND block 3 also provides a "1" output. This is coupled to 8, 21 and 24*a* as the B output signal and as input signals to the blocks 1 and 2, respectively. It is readily apparent, therefore, that all of the input signals to the block 2 are in the "1" condition and, therefore, this block provides the "0" output signal at 9** indicating the state of the circuit.

After the circuit is latched in a particular state, the input signal establishing this state may assume either level without changing the state of the circuit. If one of the other input signals assumes a "0" condition, the circuit is reset to another state as indicated in FIGURE 3. Thus, as the *b* input signal assumes a "0" condition, the blocks 1 and 2 provide "1" outputs and the block 3 provides a "0" output. The *b* input signal can then return to the "1" condition and the circuit remains latched in this state.

From the above description, it is apparent that the state of the latch is determined by the NAND block which does not receive as an input signal, the circuit input signal that is brought to a "down" level indicative of the information state. Therefore, if two or more of the input signals to the circuit are at "down" levels (the "0" condition), the circuit is unstable and cannot be latched in any information state. In such circumstances, all of the outputs will be at "up" levels ("1" condition) thereby indicating that no information is stored. The final state of the latch is determined by which one of these inputs is raised to an "up" level last.

It is obvious that the circuit of the invention retains the basic circuit configuration required for storing multiple states of information. This is accomplished by controlling the manner in which the input signals are applied to the NAND blocks, so that if it is desired to change the output signal provided by one block, it is accomplished by changing the inputs to the other blocks. The advantages derived from such an arrangement are numerous. For example, either the AND or the OR logic blocks may be employed in the circuit; both are not required for a circuit family. Secondly, a single stage of combinatorial logic can be employed using only resistors thereby eliminating the use of the semiconductor diodes normally required with two stages of logic. Moreover, the component tolerances and reliability of the circuit may be more tightly controlled by controlling the powering of each logic block rather than every two logic blocks. Additionally, such circuits lend themselves to fabrication in an integrated manner on a common substrate.

It is to be understood that the principles of the invention are not limited merely to a three state memory circuit but rather are applicable to multiple state latches for storing *n* states of information wherein *n* is understood to be any integer greater than 2. Thus, as shown in FIGURE 4, an *n* state memory circuit is provided. One two stage logical block, such as the NAND blocks 30–33, is provided for each state of information to be stored. Each of these blocks receives $2n-2$ input signals. The circuit input signals supplied at the terminals 34–37 account for $n-1$ of these input signals and the feedback signals from the other NAND blocks account for the remaining $n-1$ input signals. Each block, therefore, receives all but one circuit input signal and a feedback signal from the output of every other block; all combinations of $n-1$ input signals being employed in providing the input signals to the blocks. The output signals are provided at the terminals 38–41. The state of the latch, in such circumstances, is determined by the logic block which does not receive the particular input signal that is brought to an information state. Since this circuit operates in the same manner as that described for the three state latch, it is believed to be unnecessary to describe its operation.

The multiple state memory circuit has the advantage over two state latches in that it requires fewer active signal translating components to store the same number of states of information. As an example, a three state latch can be employed to store decimal numbers. If two state latches are employed for this purpose, four such circuits are required, but only ten of the sixteen possible states of information are utilized. If a three state latch is combined with two, two state latches, there are twelve available states to store the decimal numbers resulting in a reduction in the number of active signal translating devices from eight to seven. This basic latch may also be utilized in a double-rail binary asynchronous system of logic. In such an instance, two of the inputs would be used as the double-rail set inputs and the third input would be used as a reset for the latch. Three of the four possible combinations of the two set inputs would determine the state of the latch and the fourth combination could be employed for error detection.

While this invention has been particularly shown and described with reference to preferred embodiments thereof, it will be understood by those skilled in the art that the foregoing and other changes in form and details may be made therein without departing from the spirit and scope of the invention.

What is claimed is:

1. Memory apparatus for storing $n$ states of information as manifested by the levels of $n$ bilevel output signals provided in response to $n$ bilevel apparatus input signals, wherein $n$ is any integer greater than two, comprising:

an input circuit for supplying said $n$ apparatus input signals, an output circuit for providing said $n$ output signals manifesting the state of information stored, and $n$ logic blocks, each coupled to receive $2(n-1)$ block input signals and to provide one of said output signals at said output circuit, $n-1$ of said block input signals being supplied from said $n$ apparatus input signals so that each block is supplied all but one apparatus input signal and all combinations of $n-1$ apparatus input signals are employed in providing input signals to said $n$ blocks, and $n-1$ of said block input signals being supplied from the outputs of every other block.

2. The apparatus of claim 1, wherein each logic block has two stages of logic performed by a combinatorial logic circuit and an inverting circuit.

3. The apparatus of claim 1, wherein each logic block comprises an AND logic circuit for receiving said $2(n-1)$ block input signals and an inverting circuit responsive to the output of the AND circuit to provide said output signal.

4. The apparatus of claim 1, wherein each logic block comprises an OR logic circuit for receiving said $2(n-1)$ block input signals and an inverting circuit responsive to the output of the OR circuit to provide said output signal.

5. The apparatus of claim 1, wherein $n=3$.

6. A latch circuit responsive to $n$ circuit input signals, each being capable of residing at a first or a second level to store one of $n$ states of information as manifested by $n$ output signals, wherein $n$ is any integer greater than two, comprising:

$n$ two stage logic blocks, each of said blocks providing one of said output signals in response to $2(n-1)$ block input signals, $n-1$ of said block input signals being provided from said $n$ circuit input signals so that each of said blocks receives all but one of said $n$ circuit input signals and all combinations of $n-1$ circuit input signals are employed in providing input signals to said $n$ blocks, and $n-1$ of said signals being provided as feedback signals from the outputs of every other block, so that when one of said circuit input signals is at a first level and the remainder of said circuit input signals are at a second level, all of said blocks receiving said input signals at said first level provide an output signal at said second level and the remaining block provides an output signal at said first level, whereby said circuit is latched in the state indicated by said last named signal.

7. The circuit of claim 6, wherein each of said blocks comprises a combinatorial logic circuit for receiving said $2(n-1)$ block input signals and an inverting circuit responsive to the output of said combinatorial circuit to provide one of said output signals.

8. The circuit of claim 6, wherein $n=3$.

9. A memory circuit for providing three states of information storage manifested by the levels of first, second and third bilevel circuit output signals controlled by first, second and third bilevel circuit input signals comprising:

first, second and third logic blocks, each block having four input terminals and one output terminal for providing respective ones of said output signals, said first block being provided with said first and second circuit input signals at two of its input terminals and the output signals of said second and third blocks at the other two of its input terminals, said second block being provided with said second and third circuit input signals at two of its input terminals and the output signals of said first and third blocks at the other two of its input terminals, said third block being provided with said first and third circuit input signals at two of its input terminals and the output signals of said first and second blocks at the other two of its input terminals, so that the state of information storage of said circuit controlled by said first circuit input signal is manifested by the level of said second output signal, that controlled by said second circuit input signal by the level of said third output signal, and that controlled by said third circuit input signal by the level of said first output signal.

10. The circuit of claim 9, wherein each of said blocks has two stages of logic including a combinatorial logic circuit having said four input terminals and an inverting circuit for providing one of said output signals.

References Cited by the Examiner

UNITED STATES PATENTS 3,021,155 12/61 Jagger ---------------- 307—88.5

ARTHUR GAUSS, *Primary Examiner.*